US011540290B2

(12) United States Patent
Lei et al.

(10) Patent No.: US 11,540,290 B2
(45) Date of Patent: Dec. 27, 2022

(54) MODIFIED DOWNLINK CONTROL INFORMATION TO SUPPORT LOW TIER USER EQUIPMENT

(71) Applicant: QUALCOMM Incorporated, San Diego, CA (US)

(72) Inventors: Jing Lei, San Diego, CA (US); Ying Wang, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/143,528

(22) Filed: Jan. 7, 2021

(65) Prior Publication Data

US 2021/0219296 A1 Jul. 15, 2021

Related U.S. Application Data

(60) Provisional application No. 62/959,075, filed on Jan. 9, 2020.

(51) Int. Cl.
| | |
|---|---|
| *H04W 72/04* | (2009.01) |
| *H04L 1/00* | (2006.01) |
| *H04W 76/27* | (2018.01) |
| *H04W 76/11* | (2018.01) |

(52) U.S. Cl.
CPC ....... *H04W 72/0493* (2013.01); *H04L 1/0007* (2013.01); *H04W 72/042* (2013.01); *H04W 72/0466* (2013.01); *H04W 76/11* (2018.02); *H04W 76/27* (2018.02)

(58) Field of Classification Search
CPC ........... H04W 72/0493; H04W 72/042; H04W 72/0466; H04W 76/11; H04W 76/27; H04L 1/0007
See application file for complete search history.

(56) References Cited

U.S. PATENT DOCUMENTS

| | | | |
|---|---|---|---|
| 2014/0235243 A1* | 8/2014 | Damnjanovic | ... H04W 36/0055 455/67.11 |
| 2015/0043396 A1* | 2/2015 | Ekpenyong | ........... H04L 5/0053 370/280 |
| 2017/0280481 A1* | 9/2017 | Stern-Berkowitz | ......................... H04L 1/1854 |
| 2018/0376451 A1* | 12/2018 | Wong | ..................... H04W 68/02 |
| 2019/0174510 A1* | 6/2019 | Shin | ...................... H04W 72/00 |
| 2019/0174527 A1* | 6/2019 | Park | ....................... H04L 5/0046 |
| 2019/0174529 A1* | 6/2019 | Tie | ........................... H04W 4/70 |

(Continued)

FOREIGN PATENT DOCUMENTS

WO 2019051096 A1 3/2019

OTHER PUBLICATIONS

International Search Report and Written Opinion—PCT/US2021/070015—ISA/EPO—dated May 25, 2021.

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a modified physical downlink control channel (PDCCH) configuration for low tier UEs; receive downlink control information (DCI) configured according to the modified PDCCH configuration; and process the DCI according to the modified PDCCH configuration. Numerous other aspects are provided.

30 Claims, 11 Drawing Sheets

(56) References Cited

U.S. PATENT DOCUMENTS

| | | |
|---|---|---|
| 2019/0182632 A1* | 6/2019 | Fujishiro ............. H04W 72/005 |
| 2019/0223086 A1* | 7/2019 | Jung .................. H04W 72/0446 |
| 2019/0223160 A1* | 7/2019 | He ........................ H04L 5/0053 |
| 2019/0223197 A1* | 7/2019 | Shin ....................... H04W 76/27 |
| 2019/0254120 A1  | 8/2019 | Zhang et al. |
| 2020/0187170 A1* | 6/2020 | Shin .................... H04L 27/2666 |
| 2020/0274657 A1* | 8/2020 | Deenoo ................ H04W 76/27 |

\* cited by examiner

505: Legacy DCI
(DCI Format 1_0 with CRC scrambled by C-RNTI)

| Field (Item) | Bits | Reference |
|---|---|---|
| Identifier for DCI formats | 1 | Always set to 1, meaning this is for DL |
| Frequency domain resource assignment | Variable | Variable with DL BWP N_RB $\left\lceil \log_2(N_{RB}^{DL,BWP}(N_{RB}^{DL,BWP}+1)/2) \right\rceil$ |
| Time domain resource assignment | 4 | Carries the row index of the items in pdsch_allocationList in RRC |
| VRB-to-PRB mapping | 1 | According to 38.212 Table 7.3.1.1.2-33<br>0 : Non-Interleaved<br>1 : Inverleaved |
| Modulation and coding scheme | 5 | 38.214 - Table 5.1.3.1-1: MCS index table 1 for PDSCH<br>38.214 - Table 5.1.3.1-2: MCS index table 2 for PDSCH |
| New data indicator | 1 | |
| Redundancy version | 2 | |
| HARQ process number | 4 | |
| Downlink assignment index | 2 | |
| TPC command for scheduled PUCCH | 2 | |
| PUCCH resource indicator | 3 | |
| PDSCH-to-HARQ_feedback timing indicator | 3 | maps to k1={1,2,3,4,5,6,7,8} |

510: DCI with reduced payload size
(DCI Format X_0 with CRC scrambled by C-RNTI)

| Field (Item) | Bits | Reference |
|---|---|---|
| Identifier for DCI formats | 1 | Always set to 1, meaning this is for DL |
| Frequency domain resource assignment | Variable | Variable with reduced BWP bandwidth or reduced number of RBG bundles |
| Time domain resource assignment | 2 or 3 | Carries the down-selected row index of the items in pdsch_allocationList in RRC |
| VRB-to-PRB mapping | 1 | According to 38.212 Table 7.3.1.1.2-33<br>0 : Non-Interleaved<br>1 : Inverleaved |
| Modulation and coding scheme | 4 | 38.214 - Table 5.1.3.1-1: MCS index table 1 for PDSCH<br>38.214 - Table 5.1.3.1-2: MCS index table 2 for PDSCH |
| New data indicator | 1 | |
| Redundancy version | 2 | |
| HARQ process number | 2 or 3 | |
| Downlink assignment index | 1 | |
| TPC command for scheduled PUCCH | 2 | |
| PUCCH resource indicator | 3 | |
| PDSCH-to-HARQ_feedback timing indicator | 2 | maps to relaxed timing for k1={4,8,10,12} |

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Reduced Range of MCS Index → Use 4 bits to indicate $I_{MCS}$, or use 5 bits to indicate $I_{MCS}$, but the MSB is labeled as "unused bit", which can be mapped to less reliable position by interleaving Range of MCS Index in Legacy DCI

FIG. 6

MODIFIED DOWNLINK CONTROL INFORMATION TO SUPPORT LOW TIER USER EQUIPMENT

CROSS-REFERENCE TO RELATED APPLICATION

This Patent Application claims priority to U.S. Provisional Patent Application No. 62/959,075, filed on Jan. 9, 2020, entitled "MODIFIED DOWNLINK CONTROL INFORMATION TO SUPPORT LOW TIER USER EQUIPMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for modified downlink control information to support low tier user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of a modified physical downlink control channel (PDCCH) configuration for low tier UEs; receiving downlink control information (DCI) configured according to the modified PDCCH configuration; and processing the DCI according to the modified PDCCH configuration.

In some aspects, a method of wireless communication, performed by a base station, may include transmitting an indication of a modified PDCCH configuration for low tier user equipments (UEs); and transmitting DCI configured according to the modified PDCCH configuration.

In some aspects, a UE for wireless communication may include memory and one or more processors coupled to the memory. For example, the one or more processors may be operatively, electronically, communicatively, or otherwise coupled to the memory. The memory may comprise instructions executable by the one or more processors to cause the UE to: receive an indication of a modified PDCCH configuration for low tier UEs; receive DCI configured according to the modified PDCCH configuration; and process the DCI according to the modified PDCCH configuration.

In some aspects, a base station for wireless communication may include memory and one or more processors coupled to the memory. For example, the one or more processors may be operatively, electronically, communicatively, or otherwise coupled to the memory. The memory may comprise instructions executable by the one or more processors to cause the base station to: transmit an indication of a modified PDCCH configuration for low tier UEs; and transmit DCI configured according to the modified PDCCH configuration.

In some aspects, a non-transitory computer-readable medium may store one or more instructions for wireless communication. The one or more instructions, when executed by one or more processors of a UE, may cause the UE to: receive an indication of a modified PDCCH configuration for low tier UEs; receive DCI configured according to the modified PDCCH configuration; and process the DCI according to the modified PDCCH configuration.

In some aspects, a non-transitory computer-readable medium may store one or more instructions for wireless communication. The one or more instructions, when executed by one or more processors of a base station, may cause the base station to: transmit an indication of a modified PDCCH configuration for low tier UEs; and transmit DCI configured according to the modified PDCCH configuration.

In some aspects, an apparatus for wireless communication may include means for receiving an indication of a modified PDCCH configuration for low tier apparatuses; means for receiving DCI configured according to the modified PDCCH configuration; and means for processing the DCI according to the modified PDCCH configuration.

In some aspects, an apparatus for wireless communication may include means for transmitting an indication of a modified PDCCH configuration for low tier UEs; and means for transmitting DCI configured according to the modified PDCCH configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3-9 are diagrams illustrating examples of modified downlink control information to support low tier user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
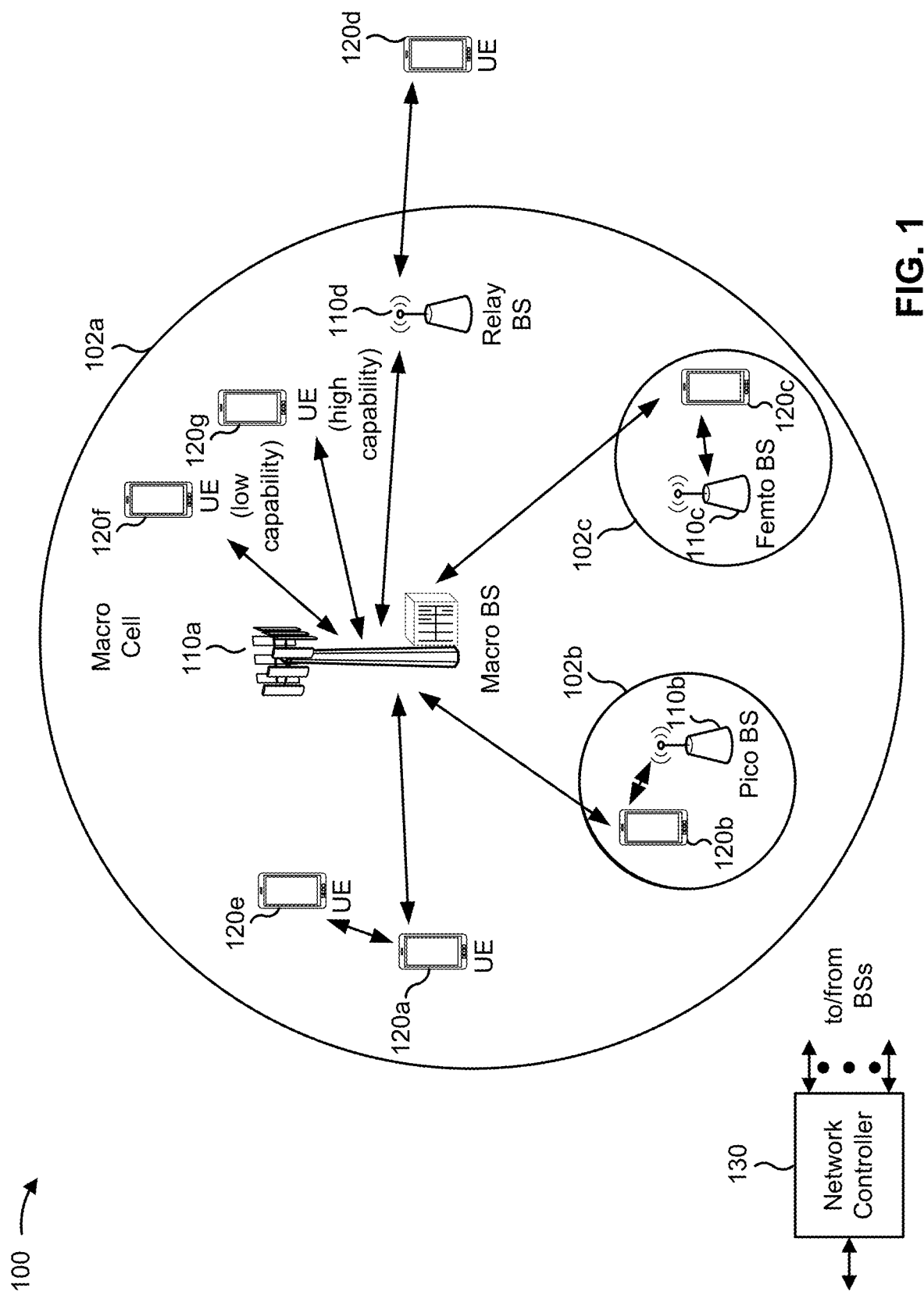
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a base station 110 may serve different UEs 120 of different categories, different UEs 120 that support different capabilities, and/or the like. For example, the base station 110 may serve a first UE 120f that has a less advanced capability (e.g., a lower capability, a reduced capability, and/or the like) and a second UE 120g that has a more advanced capability (e.g., a higher capability). For example, the first UE 120f may be a first category of UE 120 (e.g., an NR-Lite UE), and the second UE 120g may be a second category of UE 120 (e.g., an NR UE, a legacy UE, and/or the like). Additionally, or alternatively, the first UE 120f may have a reduced feature set compared to the second UE 120g. In some aspects, the first UE 120f may include an MTC UE, and eMTC UE, an IoT UE, and/or the like, as described above.

As indicated above, FIG. 1 is provided as an example. Other examples may differ from what is described with regard to FIG. 1.

Figure 2:
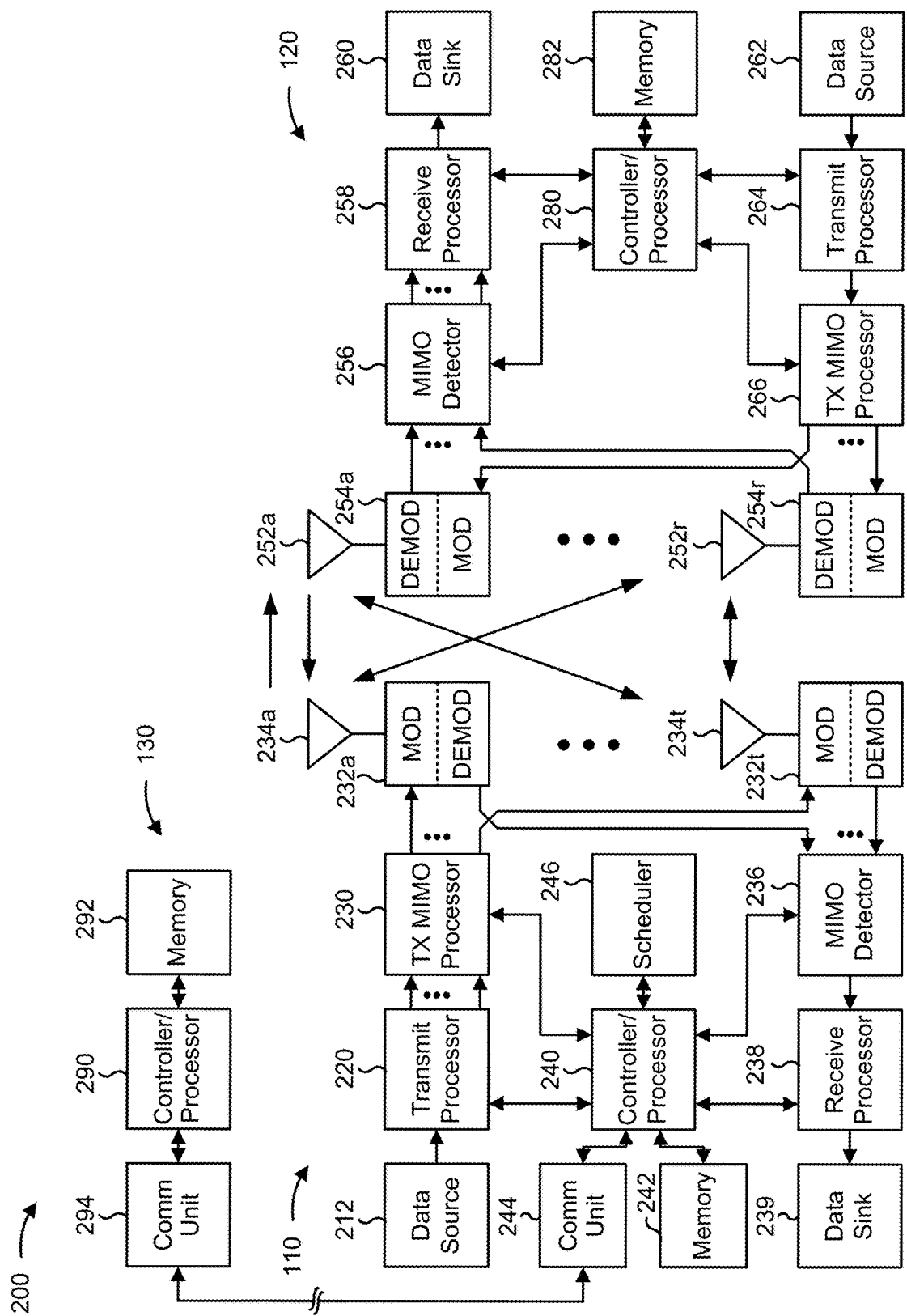
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with modified downlink control information to support low tier user equipment, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10, process 1100 of FIG. 11, and/or other processes as described herein. A scheduler 246 may schedule UEs for data transmission on the downlink and/or uplink.

In some aspects, UE 120 may include means for receiving an indication of a modified PDCCH configuration for low tier UEs; means for receiving DCI configured according to the modified PDCCH configuration; means for processing the DCI according to the modified PDCCH configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication of a modified PDCCH configuration for low tier UEs; means for transmitting DCI configured according to the modified PDCCH configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
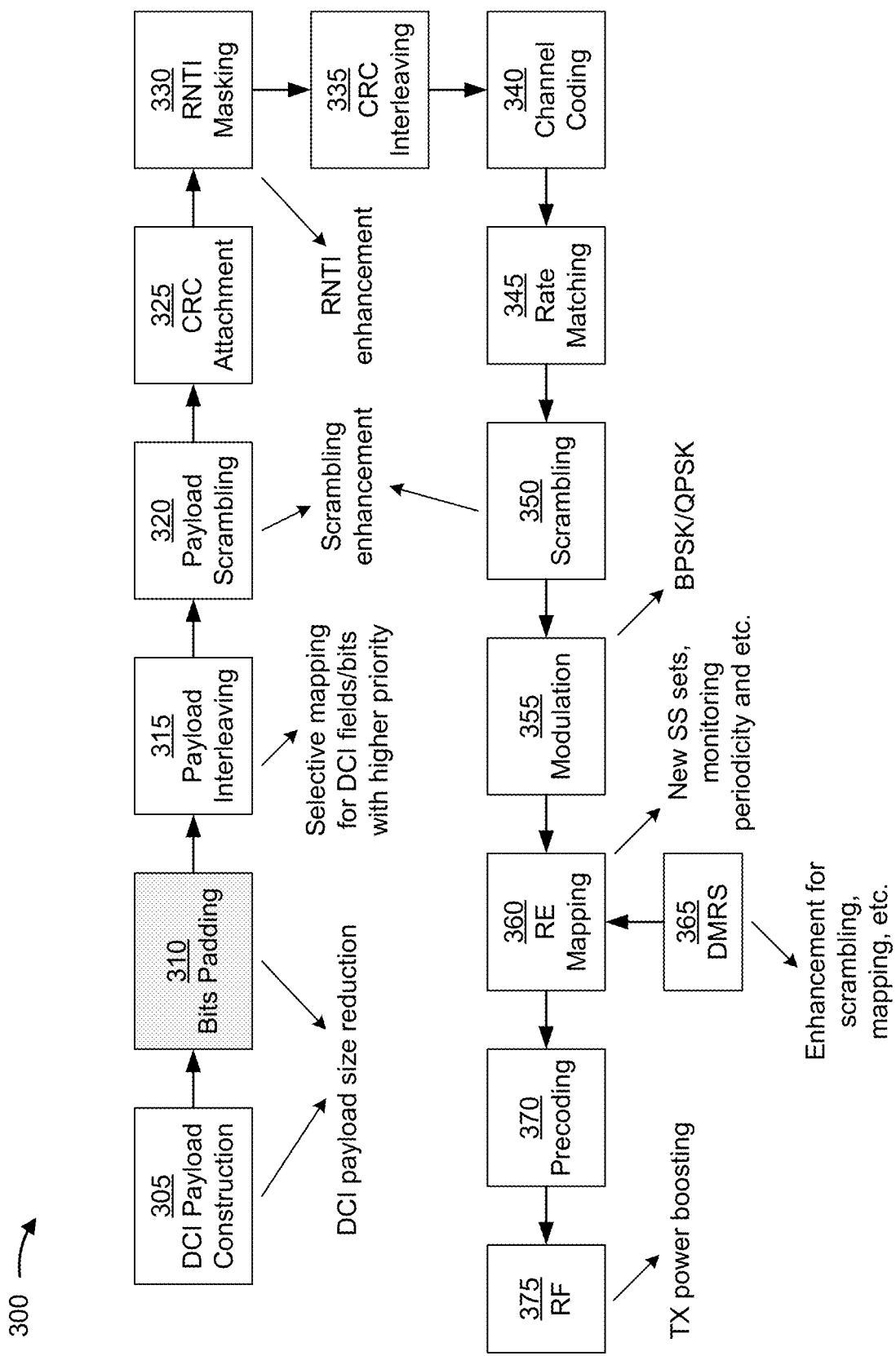

FIG. 3 is a diagram illustrating an example 300 of modified downlink control information to support low tier user equipment, in accordance with various aspects of the present disclosure.

A base station 110 may transmit downlink control information (DCI) on a physical downlink control channel (PDCCH) to indicate control information to a UE 120, such as scheduling information for a downlink communication, scheduling information for an uplink communication, a slot format indication, a pre-emption indication, power control information, and/or the like. Different DCI formats may be used for different purposes, such as scheduling a physical uplink shared channel (PUSCH) communication (e.g., using DCI format 0_0 or DCI format 0_1), scheduling a physical downlink shared channel (PDSCH) communication (e.g., using DCI format 1_0 or DCI format 1_1), indicating a slot format (e.g., using DCI format 2_0), indicating pre-emption (e.g., using DCI format 2_1), indicating transmit power control (TPC) commands (e.g., using DCI format 2_2 or DCI format 2_3), and/or the like.

Because a UE 120 performs blind decoding to obtain DCI, different DCI formats may have the same payload size (e.g., may be byte-aligned) within a bandwidth part to reduce the complexity of blind decoding. The number and/or type of DCI fields included in the payload of DCI may depend on the DCI format, a search space (SS) set configuration, a radio network temporary identifier (RNTI) associated with the DCI (e.g., used to scramble and descramble the DCI), and/or the like.

As described above in connection with FIG. 1, in some aspects, a base station 110 may serve different UEs 120 of different categories, different UEs 120 that support different capabilities, and/or the like. For example, the base station 110 may serve a first category of UEs (e.g., a low tier UE, such as UE 120f with reference to FIG. 1) that have a less advanced capability (e.g., a lower capability, a reduced capability, and/or the like) and a second category of UEs (e.g., a high tier UE or a premium UE, such as UE 120g with reference to FIG. 1) that have a more advanced capability (e.g., a higher capability). In this case, UEs of the first category may have a reduced feature set compared to UEs of the second category.

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower transmit power than UEs of the second category, may have a less advanced beamforming capability than UEs of the second category, may be capable of communicating on a narrower maximum bandwidth part than UEs of the second category, may have fewer antennas (e.g., transmit antennas and/or receive antennas) and/or antenna ports than UEs of the second category, may not be capable of full duplex communication (e.g., for frequency division duplexing (FDD)), may have a lower power class than UEs of the second category, may have a relaxed UE processing timeline or capability as compared to UEs of the second category (e.g., may not be capable of processing communications as quickly as UEs of the second category), and/or the like.

In some cases, low tier UEs may not need or may not be capable of using all of the information included in DCI designed for high tier UEs (sometimes referred to as legacy DCI). As a result, using legacy DCI for low tier UEs may result in unnecessary decoding complexity, which can increase latency and power consumption (thereby reducing battery life). Some techniques and apparatuses described herein enable support for UEs of multiple categories by modifying various physical layer procedures for the PDCCH (e.g., for DCI). These modifications may enable co-existence among UEs having different capabilities, may provide enhanced coverage for low tier UEs (e.g., to achieve the same or similar downlink coverage across different UE categories for a particular base station transmit power), and/or the like.

In some examples, a base station may communicate with an NB-IoT UE using DCI with a reduced payload size (e.g., as compared to non-NB-IoT UEs). However, NB-IoT UEs are assigned a dedicated bandwidth (e.g., of one resource block) that is not shared with other types of UEs (e.g., non-NB-IoT UEs). Thus, in an NB-IoT operating mode, there is no need for a UE to differentiate between DCI formats or sizes targeting different types of UE capabilities using blind decoding because all DCI transmitted in NB-IoT frequency bands is intended for NB-IoT UEs. In other words, in NB-IoT bands, there are not any coexistence issues between NB-IoT UEs and non-NB-IoT UEs. Thus, in NB-IoT, there is no modified PDCCH configuration as described herein (e.g., because NB-IoT configurations are specified in 3GPP standards to reduce signaling overhead).

FIG. 3 provides an overview of example modifications that can be made to PDCCH procedures to support various categories of UEs. A base station 110 may use one or more modifications shown in FIG. 3 when processing DCI for transmission.

As shown in FIG. 3, the base station 110 may construct a DCI payload at block 305. In some aspects, the base station 110 may reduce a size of the DCI payload for low tier UEs as compared to legacy DCI used for high tier UEs. Depending on a size of the DCI payload, the base station 110 may perform bit padding at block 310. Bit padding may be performed to achieve byte alignment across different DCI formats to reduce blind decoding complexity. In some cases, when the DCI fields fill a last byte of the DCI payload completely (e.g., fill all 8 bits of the last byte), the base station 110 need not perform bit padding. Additional details are described below in connection with FIGS. 4-6.

The base station 110 may perform DCI payload interleaving at block 315. In some aspects, the base station 110 may use a different interleaver and/or a different interleaving pattern for DCI for low tier UEs as compared to legacy DCI used for high tier UEs. In some aspects, the interleaving used for low tier UEs may map higher priority bits (e.g., bits that are used or are more important for low tier UEs) to positions (e.g., channels, sub-blocks of an OFDM symbol, and/or the like) with higher reliability, and may map lower priority bits (e.g., bits that are not used or are less important for low tier UEs) to positions with lower reliability. Additional details are described below in connection with FIGS. 4 and 7.

The base station 110 may perform DCI payload scrambling at block 320 (e.g., prior to cyclic redundancy check (CRC) attachment). In some aspects, the base station 110 may use different scrambling identifiers, when scrambling the DCI payload, to indicate different control information. In some aspects, the control information indicated by the scrambling identifier used to scramble the DCI payload may be excluded from the DCI payload to reduce DCI payload size. Additional details are described below in connection with FIGS. 4 and 9.

The base station 110 may perform CRC attachment at block 325, and may perform RNTI masking at block 330. In some aspects, the base station 110 may use an RNTI with a different length (e.g., a longer length) to mask DCI for low tier UEs as compared to a length of a RNTI used to mask legacy DCI used for high tier UEs. Additional details are described below in connection with FIGS. 4 and 8.

The base station 110 may perform CRC interleaving at block 335, may perform channel coding at block 340, may perform rate-matching at block 345, and may perform additional DCI scrambling (e.g., of DCI payload plus CRC bits) at block 350. As described above, the base station 110 may use different scrambling identifiers, when scrambling the combination of DCI payload and CRC bits, to indicate different control information. In some aspects, the control information indicated by the scrambling identifier used to scramble the DCI payload and the CRC bits may be excluded from the DCI payload to reduce DCI payload size. Additional details are described below in connection with FIGS. 4 and 9.

The base station 110 may perform modulation at block 355. In some aspects, the base station 110 may use a different modulation scheme and/or a different modulation and coding scheme (MCS) to modulate DCI for low tier UEs (e.g., a lower MCS, such as binary phase-shift keying (BPSK) or quadrature phase-shift keying (QPSK), among other examples) as compared to a modulation scheme and/or an MCS used to modulate legacy DCI for high tier UEs.

The base station 110 may perform resource element (RE) mapping at block 360. In some aspects, the base station 110 may map REs to a different CORESET and/or a different SS (e.g., with a larger monitoring periodicity, among other examples) for DCI for low tier UEs as compared to legacy DCI for high tier UEs. As shown, RE mapping may be performed for the DCI and for DMRS, associated with the DCI, generated at block 365, which may be multiplexed with the DCI. In some aspects, the base station 110 may use different scrambling identifiers, when scrambling the DMRS associated with the DCI, to indicate different control information. In some aspects, the control information indicated by the scrambling identifier used to scramble the DMRS may be excluded from the DCI payload to reduce DCI payload size. Additional details are described below in connection with FIGS. 4 and 9.

The base station 110 may perform precoding at block 370, and may perform radio frequency (RF) transmission operations at block 375. In some aspects, the base station 110 may use a different transmit power (e.g., by applying different transmit power boosting) for DCI for low tier UEs as compared to legacy DCI for high tier UEs.

By applying one or more techniques or operations described above, the base station 110 may enable support for UEs of multiple categories. These modifications may enable co-existence among UEs having different capabilities, may provide enhance coverage for low tier UEs, may reduce latency, may conserve UE resources (e.g., processing resources, memory resources, or battery power, among other examples), and/or the like.

As indicated above, FIG. 3 is provided as an example. Other examples may differ from what is described with respect to FIG. 3.

Figure 4:
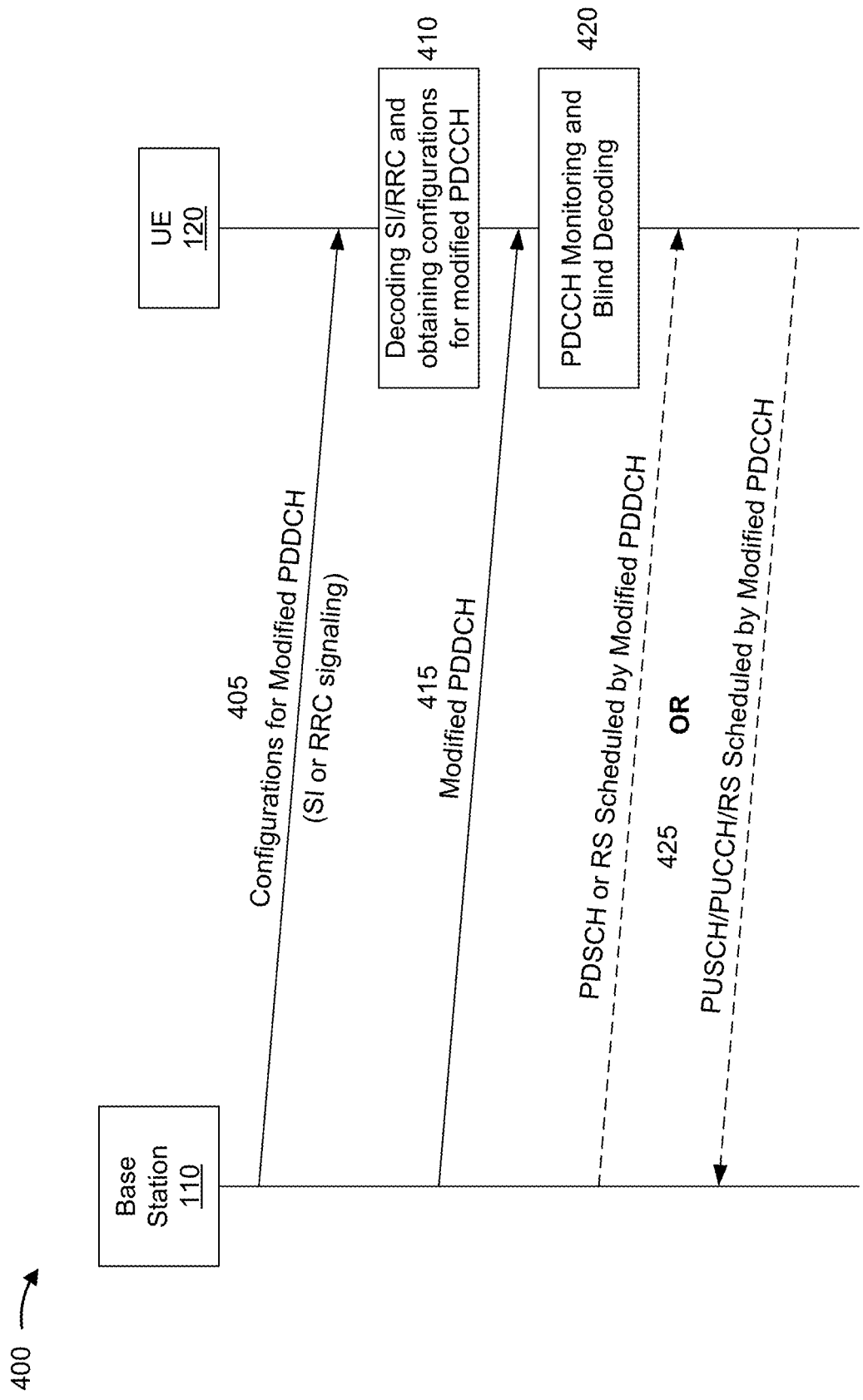

FIG. 4 is a diagram illustrating an example 400 of modified downlink control information to support low tier user equipment, in accordance with various aspects of the present disclosure. As shown in FIG. 4, a base station 110 and a UE 120 may communicate with one another.

As shown by reference number 405, the base station 110 may transmit, to the UE 120, an indication of a modified PDCCH configuration (sometimes referred to as an enhanced PDCCH). In some aspects, the modified PDCCH configuration may be designed for low tier UEs. Additionally, or alternatively, the modified PDCCH configuration may be different from a PDCCH configuration used for legacy DCI (e.g., for high tier UEs). As shown, the indication of the modified PDCCH configuration may be included in system information (SI) (e.g., one or more system information block (SIBs)), a radio resource control (RRC) message (e.g., an RRC configuration message or an RRC reconfiguration message, among other examples), and/or the like. As shown by reference number 410, the UE 120 may receive the modified PDCCH configuration (e.g., by obtaining and/or decoding SI and/or an RRC message that includes the modified PDCCH configuration).

Although some techniques are described herein in connection with the modified PDCCH configuration being designed for and/or used by low tier UEs, in some aspects, the modified PDCCH configuration may be used and/or leveraged by a high tier UE, such as a high tier UE needing enhanced coverage (e.g., located near a cell edge, measuring an RSRP parameter that is less than or equal to a threshold, and/or the like), a high tier UE in a power saving mode, and/or the like.

In some aspects, the indication of the modified PDCCH configuration may include an indication of whether to monitor for legacy DCI or whether to monitor for DCI with a reduced payload size compared to the legacy DCI. For example, the indication may include a set of bits (e.g., one or more bits). In some aspects, a bit, of the set of bits, may be set to a first value (e.g., 0) to indicate that legacy DCI is to be monitored, and may be set to a second value (e.g., 1) to indicate that DCI with a reduced payload size (compared to the legacy DCI) is to be monitored. Additionally, or alternatively, the indication of the modified PDCCH configuration for low tier UEs may include an indication of a DCI format for the DCI with the reduced payload size. For example, one or more bits, of the set of bits, may indicates a DCI format for the DCI with the reduced payload size. Additional details regarding different DCI payload sizes and different DCI formats are described below in connection with FIGS. 5 and 6.

In some aspects, the indication of the modified PDCCH configuration may include an indication of whether to use a first de-interleaving pattern associated with legacy DCI or a second de-interleaving pattern associated with DCI in which one or more low priority bits of the DCI are mapped to one or more less reliable positions as compared to one or more high priority bits of the DCI. Additionally, or alternatively, the indication of the modified PDCCH configuration may include an indication of whether to use a first frozen bit repetition pattern associated with legacy DCI or a second frozen bit repetition pattern associated with DCI in which one or more low priority bits of the DCI are mapped to one or more less reliable positions as compared to one or more high priority bits of the DCI. For example, the indication may include a set of bits (e.g., one or more bits). In some aspects, a bit, of the set of bits, may be set to a first value (e.g., 0) to indicate that the first de-interleaving pattern is to be used, and may be set to a second value (e.g., 1) to indicate that the second de-interleaving pattern is to be used. Additionally, or alternatively, a bit, of the set of bits, may be set to a first value (e.g., 0) to indicate that the first frozen bit repetition pattern is to be used, and may be set to a second value (e.g., 1) to indicate that the second frozen bit repetition pattern is to be used. Additional details regarding different de-interleaving patterns and different frozen bit repetition patterns are described below in connection with FIG. 7.

In some aspects, the indication of the modified PDCCH configuration includes an indication of whether to use an RNTI having a first bit length (e.g., a shorter bit length, such as 16 bits) to decode DCI or an RNTI having a second bit length (e.g., a longer bit length, such as more than 16 bits) to decode DCI. For example, the indication may include a set of bits (e.g., one or more bits). In some aspects, a bit, of the set of bits, may be set to a first value (e.g., 0) to indicate that the RNTI having the first bit length is to be used, and may be set to a second value (e.g., 1) to indicate that the RNTI having the first bit length is to be used. Additionally, or alternatively, a bit, of the set of bits, may indicate the second bit length (e.g., by indicating an integer value that is added to the first bit length to compute the second bit length). Additional details regarding different RNTI lengths are described below in connection with FIG. 8.

In some aspects, the indication of the modified PDCCH configuration may include an indication of whether to test multiple scrambling identifiers when processing the DCI and/or when processing a demodulation reference signal associated with the DCI. For example, the indication may include a set of bits (e.g., one or more bits). In some aspects, a bit, of the set of bits, may be set to a first value (e.g., 0) to indicate that multiple scrambling identifiers are not to be tested, and may be set to a second value (e.g., 1) to indicate that multiple scrambling identifiers are to be tested. Additionally, or alternatively, the indication of the modified PDCCH configuration may include an indication of whether to use a linear scrambling scheme for the DCI and/or for a DMRS associated with the DCI (e.g., based at least in part on a bit being set to a first value, such as 0) or a non-linear scrambling scheme for the DCI and/or the DMRS associated with the DCI (e.g., based at least in part on a bit being set to a second value, such as 1). Additional details regarding testing multiple scrambling identifiers and using linear or non-linear scrambling schemes are described below in connection with FIG. 9.

In some aspects, the indication of the modified PDCCH configuration may include multiple indications described elsewhere herein (e.g., above). For example, the indication of the modified PDCCH configuration may include a bitmap (e.g., a set of bits, as described above). Different bits or groups of bits in the bitmap may correspond to different indications described above.

As shown by reference number 415, the base station 110 may transmit a modified PDCCH communication (e.g., DCI) to the UE 120. The modified PDCCH communication may be transmitted and/or configured according to the modified PDCCH configuration indicated by the base station 110. For example, the base station 110 may perform one or more operations described above in connection with FIG. 3 to generate and/or transmit the modified PDCCH communication according to the modified PDCCH configuration. For example, the base station 110 may use a payload size, an interleaving pattern, a frozen bit repetition pattern, a RNTI length, a scrambling identifier, and/or a scrambling scheme, among other examples, indicated by the modified PDCCH configuration.

As shown by reference number 420, the UE 120 may process the modified PDCCH communication (e.g., the DCI) according to the modified PDCCH configuration. Such processing may include, for example, PDCCH monitoring, blind decoding, payload interpretation, de-interleaving, decoding, RNTI demasking, descrambling, and/or the like. For example, the UE 120 may use a payload size, a de-interleaving pattern, a frozen bit repetition pattern, a RNTI length, a descrambling identifier, and/or a descrambling scheme, among other examples, indicated by the modified PDCCH configuration.

As shown by reference number 425, the base station 110 and the UE 120 may communicate based at least in part on contents of the DCI payload. For example, the DCI may schedule a PDSCH communication or a downlink reference signal (RS), and the base station 110 may transmit the PDSCH communication or the downlink RS to the UE 120. Additionally, or alternatively, the DCI may schedule a PUSCH communication, a physical uplink control channel (PUCCH) communication, or an uplink RS, and the UE 120 may transmit the PUSCH communication, the PUCCH communication, or the uplink RS to the base station 110.

By indicating to the UE 120 whether to use a modified PDCCH configuration (or a legacy PDCCH configuration), the base station 110 may enable support for UEs of multiple categories. These modifications may enable co-existence among UEs having different capabilities, may provide enhance coverage for low tier UEs, may reduce latency, may conserve UE resources (e.g., processing resources, memory resources, or battery power, among other examples), and/or the like.

As indicated above, FIG. 4 is provided as an example. Other examples may differ from what is described with respect to FIG. 4.

FIG. 5 is a diagram illustrating an example 500 of modified downlink control information to support low tier user equipment, in accordance with various aspects of the present disclosure. As described above in connection with FIG. 4, in some aspects, the indication of the modified PDCCH configuration includes an indication of whether to monitor for legacy DCI 505 or whether to monitor for DCI 510 with a reduced payload size compared to the legacy DCI (sometimes referred to as reduced payload DCI 510). Additionally, or alternatively, the indication of the modified PDCCH configuration may include an indication of a DCI format for the reduced payload DCI 510. A DCI format may indicate the DCI fields included in DCI having the DCI format, the arrangement or order of the DCI fields, a number of bits included in each DCI field, and/or the like.

In example 500, the legacy DCI 505 has DCI format 1_0 and is CRC scrambled using a cell RNTI (C-RNTI). The reduced payload DCI 510 in example 500 may correspond to the legacy DCI 505 in example 500, meaning that the reduced payload DCI 510 may have a DCI format corresponding to DCI format 1_0 (such as DCI format X_0, where X equals, for example, 3 or 4), may be used for the same purpose as the legacy DCI 505 (e.g., to schedule a PDSCH communication), and/or may be CRC scrambled using the same RNTI as the legacy DCI 505 (e.g., a C-RNTI in example 500). The type of DCI shown in FIG. 5 (e.g., DCI format 1_0 scrambled using a C-RNTI) is shown as an example, and the techniques described herein may apply to other types of DCI (e.g., having different DCI formats or RNTI scrambling), which may include additional DCI fields, fewer DCI field, different DCI fields, or different arrangements of DCI fields than those shown in FIG. 5.

In some aspects, reduced payload DCI may exclude one or more fields that are included in a corresponding legacy DCI. For example, a reserved bit field included in legacy DCI may be excluded from a corresponding reduced payload DCI (e.g., for DCI format 1_0). Additionally, or alternatively, a legacy DCI field that indicates one or more parameters for a second transport block (TB) of a multi-TB communication (e.g., a field that indicates an MCS, a new data indicator (NDI), and/or a redundancy value (RV) for Transport Block 2) may be excluded from a corresponding reduced payload DCI (e.g., in DCI format 1_1). Additionally, or alternatively, a number of DCI fields that include a slot format indicator (e.g., in DCI format 2_0) in legacy DCI may be reduced in corresponding reduced payload DCI. For example, the reduced payload DCI may include fewer fields to indicate a slot format indicator than the corresponding legacy DCI.

Additionally, or alternatively, the reduced payload DCI may exclude one or more bits of one or more DCI fields included in the legacy DCI. For example, the reduced payload DCI may have fewer bits in a particular DCI field than the number of bits included in the legacy DCI for that particular DCI field. For example, a frequency domain resource assignment (FDRA) field, a time domain resource assignment (TDRA) field, an MCS field, a hybrid automatic repeat request (HARQ) process number field, a downlink assignment index (DAI) index, a reserved bit field, or a bit padding field, among other examples, in legacy DCI may have a reduced size (e.g., fewer bits) in corresponding reduced payload DCI. In example 500, the FDRA field, the TDRA field, the MCS field, the HARQ process number field, and the DAI field include fewer bits in the reduced payload DCI 510 as compared to the corresponding legacy DCI 505.

By providing modified DCI with a reduced payload size as compared to legacy DCI, UE resources may be conserved due to less complex decoding, coverage may be enhanced due to less likelihood of a failed decoding, latency may be reduced, and/or the like.

As indicated above, FIG. 5 is provided as an example. Other examples may differ from what is described with respect to FIG. 5.

FIG. 6 is a diagram illustrating an example 600 of modified downlink control information to support low tier user equipment, in accordance with various aspects of the present disclosure.

FIG. 6 shows an example of reducing a size of the MCS field in DCI, as indicated above in connection with FIG. 5. In some aspects, legacy DCI may include 5 bits for the MCS field, such as to indicate one of 32 possible MCS index values. In some aspects, a corresponding reduced payload DCI may include 4 bits for the MCS field, such as to indicate one of 16 possible MCS index values, which may be down-selected from (e.g., may be a subset of) the 32 possible MCS index values of legacy DCI.

Alternatively, the MCS field in the reduced payload DCI may be 5 bits in length, but the most significant bit (MSB) may be mapped to a less reliable position during interleaving, while the 4 least significant bits (LSBs) may be mapped to more reliable positions (e.g., than the MSB) during interleaving. Additional details of interleaving are described below in connection with FIG. 7.

As indicated above, FIG. 6 is provided as an example. Other examples may differ from what is described with respect to FIG. 6.

Figure 7:
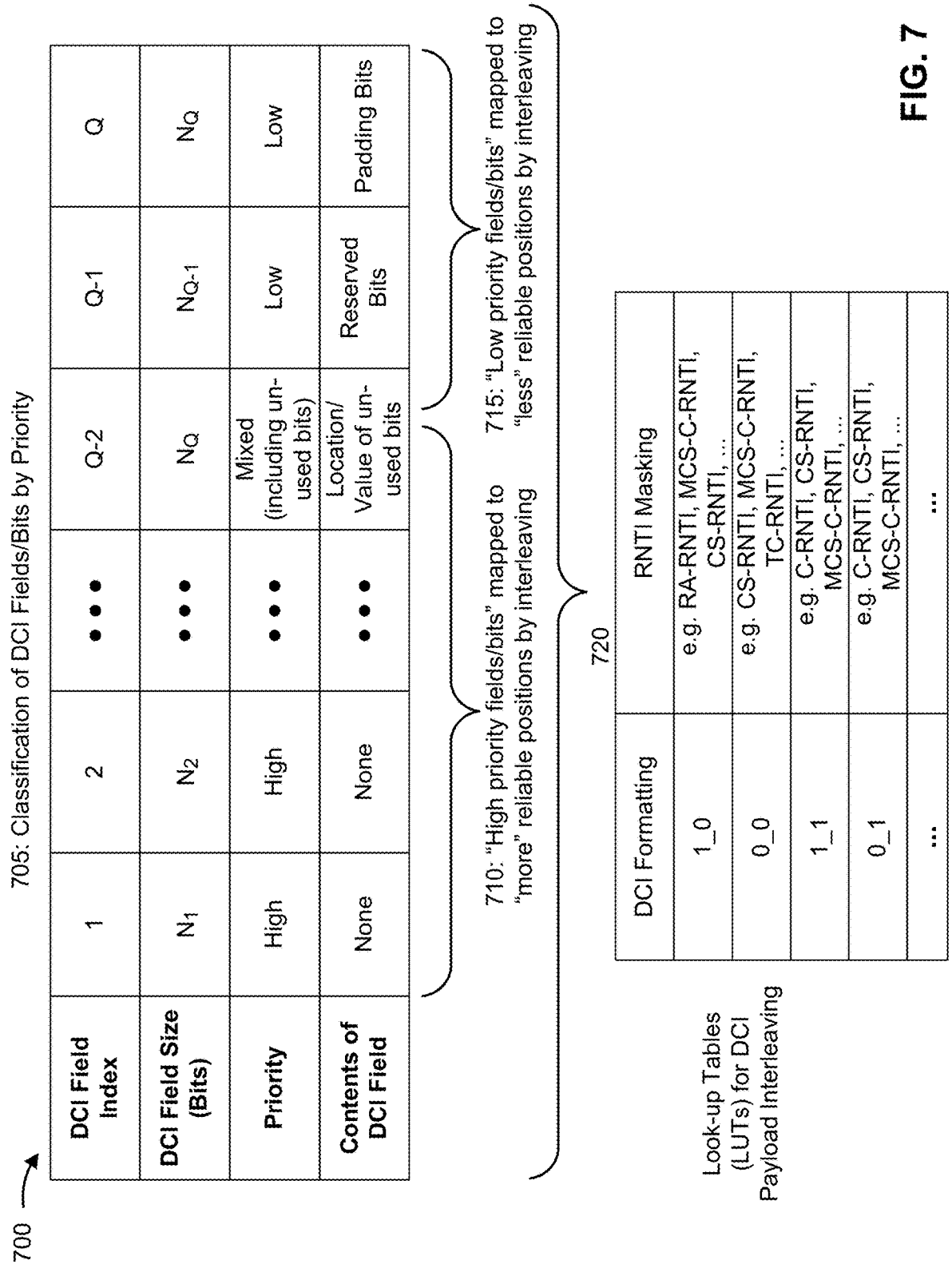

FIG. 7 is a diagram illustrating an example 700 of modified downlink control information to support low tier user equipment, in accordance with various aspects of the present disclosure. As described above in connection with FIG. 4, in some aspects, the indication of the modified PDCCH configuration may include an indication of whether to use at least one of a first de-interleaving pattern or a first frozen bit repetition pattern associated with legacy DCI or at least one of a second de-interleaving pattern or a second frozen bit repetition pattern associated with non-legacy DCI in which one or more low priority bits of the non-legacy DCI are mapped to one or more less reliable positions as compared to one or more high priority bits of the non-legacy DCI.

As shown by reference number 705, DCI fields and/or bits of DCI fields may be classified as having different priorities. The classification may depend on, for example, a type of DCI field, an whether a bit is used or unused, whether a UE 120 could determine the bit value using information other than DCI (e.g., using a RNTI or an SS set configuration, among other examples), and/or the like. As shown by reference number 710, higher priority DCI field and/or DCI bits may be mapped to more reliable positions (e.g., channels or sub-blocks of an OFDM symbol, among other examples) using interleaving (e.g., polar coding) at the base station 110. As shown by reference number 715, lower priority DCI field and/or DCI bits may be mapped to less reliable positions using interleaving (e.g., polar coding) at the base station 110. Lower priority bits may include reserved bits, padding bits, unused bits, bits implicitly mapped to an RNTI or an SS set configuration, and/or the like.

When the base station 110 indicates a de-interleaving pattern and/or a frozen bit pattern to the UE 120 (e.g., in an RRC message), the UE 120 may use one or both of those patterns to properly de-interleave and/or decode the DCI. This may improve reliability for more important DCI content. As shown by reference number 720, in some aspects, the de-interleaving pattern and/or the frozen bit pattern may depend on (e.g., may be specific to) a DCI format, a DCI payload size, a RNTI used to scramble or mask the DCI, and/or the like. Thus, different de-interleaving patterns may be used for different combinations of DCI format, DCI payload size, RNTI, and/or the like (e.g., to account for differences in the field and/or the priorities of those fields included in different types of DCI). In some aspects, the base station 110 may configure the UE 120 with a look-up table (LUT) for the de-interleaving pattern and/or the frozen bit pattern (e.g., in an RRC message). Different LUTs may correspond to different combinations of DCI format, DCI payload size, and/or RNTI.

In some aspects, the base station 110 may indicate, to the UE 120, one or more values corresponding to one or more low priority bits of DCI in signaling other than DCI, such as in system information, an RRC message, and/or the like. Additionally, or alternatively, the UE 120 may determine one or more values corresponding to one or more low priority bits of DCI based at least in part on a RNTI associated with the UE 120 (e.g., a RNTI used to descramble the DCI, among other examples), an SS set configuration (e.g., used for the DCI), and/or the like.

As indicated above, FIG. 7 is provided as an example. Other examples may differ from what is described with respect to FIG. 7.

Figure 8:
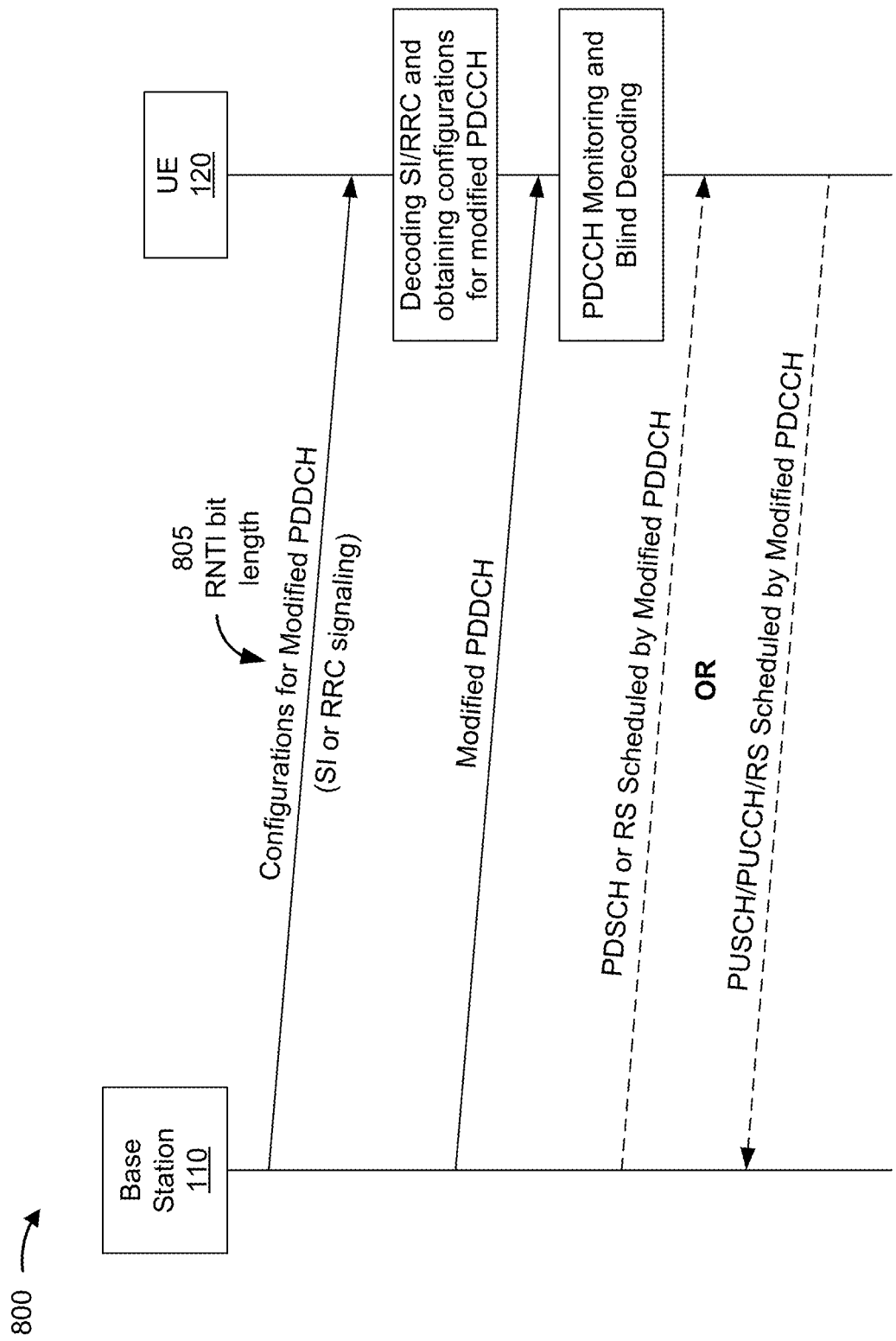

FIG. 8 is a diagram illustrating an example 800 of modified downlink control information to support low tier user equipment, in accordance with various aspects of the present disclosure. As described above in connection with FIG. 4, in some aspects, the indication of the modified PDCCH configuration may include an indication of whether to use an RNTI having a first bit length (e.g., a shorter bit length) to decode the DCI or an RNTI having a second bit length (e.g., a longer bit length) to decode the DCI. In some aspects, the first bit length is 16 bits (e.g., for legacy DCI) and the second bit length is more than 16 bits (e.g., for non-legacy DCI).

As shown by reference number 805, in some aspects, the indication of the modified PDCCH configuration may include an indication of the second bit length. For example, the indication of the modified PDCCH configuration may indicate an integer value (e.g., AS), and the second bit length may be greater than the first bit length by the integer value. In this case, the UE 120 may calculate the second bit length as the first bit length (e.g., which may be fixed at 16 bits) plus the integer value indicated in the modified PDCCH configuration. Additionally, or alternatively, the indication of the second bit length (e.g., the integer value) may be included in system information, an RRC message, and/or the like (e.g., separate from the modified PDCCH configuration, in some aspects). In some aspects, the RNTI having the second bit length may be used in a UE-specific search space (USS) (sometimes referred to as a UE search space), a common search space (CSS), or both the USS and the CSS. Additionally, or alternatively, the RNTI having the second bit length may be used for a particular DCI format, a particular set or subset of DCI formats, or for all DCI formats.

By increasing a number of bits used for the RNTI, the wireless communication system may be capable of supporting a greater number of UEs and/or a greater number of UEs with different capabilities (e.g., within an overlapping uplink and/or downlink bandwidth part) with reduced likelihood of RNTI masking collision.

When transmitting DCI (e.g., group-common (GC) DCI and/or non-GC DCI), the base station 110 may determine whether to scramble (e.g., mask) the DCI using the RNTI having the first bit length or the RNTI having the second bit length based at least in part on whether the DCI is intended for (e.g., contains information for, is to be transmitted to, and/or the like) a UE of a first category (e.g., a low tier UE), a UE of a second category (e.g., a high tier UE or a premium UE), or both. For example, if the DCI is intended for only UEs of the first category and not UEs of the second category, then the base station 110 may use the RNTI having the second (e.g., longer) bit length. In this case, at least one of the additional bits (e.g., the AS bits, the MSBs beyond the $16^{th}$ bit, and/or the like) may be set to 1. As another example, if the DCI is intended for only UEs of the second category and not UEs of the first category, or if the DCI is intended for both UEs of the first category and UEs of the second category, then the base station 110 may use the RNTI having the first (e.g., shorter) bit length. In this case, all of the additional bits (e.g., the AS bits, the MSBs beyond the $16^{th}$ bit, and/or the like) may be set to 0. In this way, the base station 110 may enable coexistence between UEs of the first category and UEs of the second category.

As indicated above, FIG. 8 is provided as an example. Other examples may differ from what is described with respect to FIG. 8.

Figure 9:
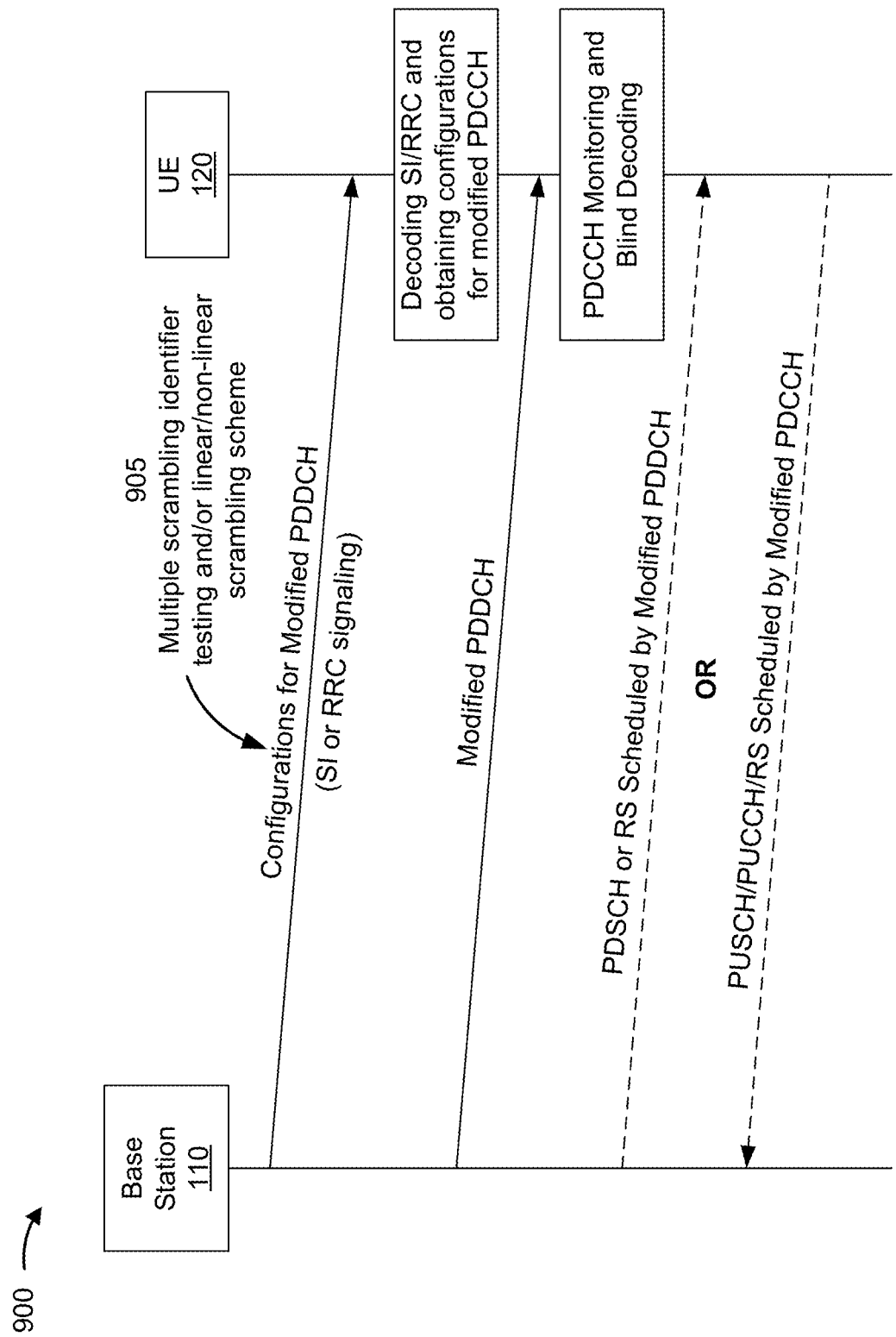

FIG. 9 is a diagram illustrating an example 900 of modified downlink control information to support low tier user equipment, in accordance with various aspects of the present disclosure. As described above in connection with FIG. 4, in some aspects, the indication of the modified PDCCH configuration may include an indication of whether to test multiple scrambling identifiers when processing the DCI or a demodulation reference signal associated with the DCI, as shown by reference number 905.

When multiple scrambling identifier testing is enabled, a first scrambling identifier may indicate a first value (e.g., 0) for a bit excluded from the DCI if a CRC of the DCI succeeds (e.g., passes) using the first scrambling identifier. Similarly, a second scrambling identifier may indicate a second value (e.g., 1) for the bit if the CRC of the DCI succeeds using the second scrambling identifier. Additionally, or alternatively, the first scrambling identifier may indicate a first value for a DCI field excluded from the DCI, and the second scrambling identifier may indicate a second value for the DCI field. For example, a scrambling identifier may indicate a value of a VRB-to-PRB mapping field, an NDI field, an RV field, a DAI field, a TB scaling field, a normal uplink (NUL) carrier and/or a supplemental uplink (SUL) carrier field, and/or the like. In some aspects, scrambling with the scrambling identifier may be performed prior to channel coding (e.g., in block 320 of FIG. 3) and/or after channel coding (e.g., in block 350 of FIG. 3).

By using a scrambling identifier to indicate one or more bits of the DCI, those one or more bits may be excluded from the DCI, thereby reducing decoding complexity and signaling overhead. In some aspects, multiple scrambling identifier testing may be enabled and/or used to reduce a number of bytes and/or a number of padding bits included in the DCI.

Additionally, or alternatively, the indication of the modified PDCCH configuration may include an indication of whether to use a linear scrambling scheme for the DCI and/or a DMRS associated with the DCI or a non-linear scrambling scheme for the DCI and/or the DMRS associated with the DCI, as also shown by reference number 905. For example, a non-linear scrambling scheme may be used for DCI and/or the DMRS to improve inter-cell interference mitigation for channel estimation and/or DCI detection.

As indicated above, FIG. 9 is provided as an example. Other examples may differ from what is described with respect to FIG. 9.

Figure 10:
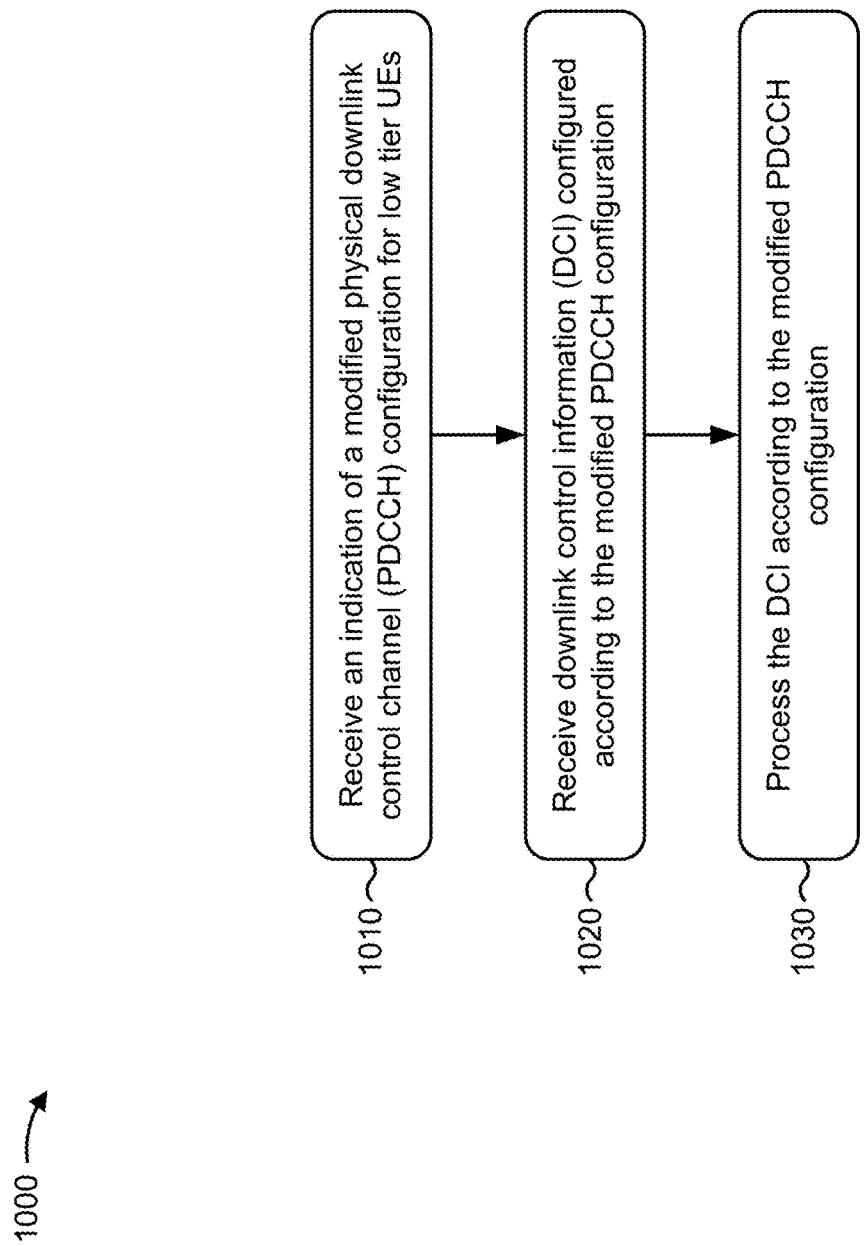
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with modified downlink control information to support low tier user equipment.

As shown in FIG. 10, in some aspects, process 1000 may include receiving an indication of a modified PDCCH configuration for low tier UEs (block 1010). For example, the UE (e.g., using receive processor 258, controller/processor 280, memory 282, and/or the like) may receive an indication of a modified PDCCH configuration for low tier UEs, as described above.

As further shown in FIG. 10, in some aspects, process 1000 may include receiving DCI configured according to the modified PDCCH configuration (block 1020). For example, the UE (e.g., using receive processor 258, controller/processor 280, memory 282, and/or the like) may receive DCI configured according to the modified PDCCH configuration, as described above.

As further shown in FIG. 10, in some aspects, process 1000 may include processing the DCI according to the modified PDCCH configuration (block 1030). For example, the UE (e.g., using receive processor 258, controller/processor 280, memory 282, and/or the like) may process the DCI according to the modified PDCCH configuration, as described above.

Process 1000 may include additional aspects, such as any single aspect or any combination of aspects described below and/or in connection with one or more other processes described elsewhere herein.

In a first aspect, the indication of the modified PDCCH configuration for low tier UEs is included in system information, a radio resource control message, or a combination thereof.

In a second aspect, alone or in combination with the first aspect, the indication of the modified PDCCH configuration for low tier UEs includes an indication of whether to monitor for legacy DCI or whether to monitor for DCI with a reduced payload size compared to the legacy DCI.

In a third aspect, alone or in combination with one or more of the first and second aspects, the indication of the modified PDCCH configuration for low tier UEs includes an indication of a DCI format for the DCI with the reduced payload size.

In a fourth aspect, alone or in combination with one or more of the first through third aspects, the DCI with the reduced payload size excludes one or more DCI fields included in the legacy DCI, one or more bits of one or more DCI fields included in the legacy DCI, or a combination thereof.

In a fifth aspect, alone or in combination with one or more of the first through fourth aspects, the indication of the modified PDCCH configuration for low tier UEs includes an indication of whether to use at least one of a first de-interleaving pattern or a first frozen bit repetition pattern associated with legacy DCI or at least one of a second de-interleaving pattern or a second frozen bit repetition pattern associated with DCI in which one or more low priority bits of the DCI are mapped to one or more less reliable positions as compared to one or more high priority bits of the DCI.

In a sixth aspect, alone or in combination with one or more of the first through fifth aspects, the second de-interleaving pattern or the second frozen bit repetition pattern is specific to at least one of a DCI format, a DCI payload size, or a radio network temporary identifier associated with the DCI.

In a seventh aspect, alone or in combination with one or more of the first through sixth aspects, the one or more low priority bits include at least one of a reserved bit, a padding bit, an unused bit, a bit mapped to a radio network temporary identifier, a bit mapped to a search space set configuration, or a combination thereof.

In an eighth aspect, alone or in combination with one or more of the first through seventh aspects, the second de-interleaving pattern or the second frozen bit repetition pattern is indicated in a radio resource control message.

In a ninth aspect, alone or in combination with one or more of the first through eighth aspects, one or more values corresponding to the one or more low priority bits are indicated in system information or in a radio resource control message.

In a tenth aspect, alone or in combination with one or more of the first through ninth aspects, one or more values corresponding to the one or more low priority bits are determined based at least in part on a radio network temporary identifier, a search space set configuration, or a combination thereof.

In an eleventh aspect, alone or in combination with one or more of the first through tenth aspects, the indication of the modified PDCCH configuration for low tier UEs includes an indication of whether to use a radio network temporary identifier (RNTI) having a first bit length to decode the DCI or an RNTI having a second bit length to decode the DCI, the first bit length is shorter than the second bit length.

In a twelfth aspect, alone or in combination with one or more of the first through eleventh aspects, the first bit length is 16 bits and the second bit length is greater than 16 bits.

In a thirteenth aspect, alone or in combination with one or more of the first through twelfth aspects, the indication of the modified PDCCH configuration for low tier UEs includes an indication of the second bit length.

In a fourteenth aspect, alone or in combination with one or more of the first through thirteenth aspects, the indication of the modified PDCCH configuration for low tier UEs includes an indication of whether to test multiple scrambling identifiers when processing the DCI or a demodulation reference signal associated with the DCI.

In a fifteenth aspect, alone or in combination with one or more of the first through fourteenth aspects, a first scrambling identifier indicates a first value for a bit excluded from the DCI if a cyclic redundancy check of the DCI succeeds using the first scrambling identifier, and a second scrambling identifier indicates a second value for the bit if the cyclic redundancy check of the DCI succeeds using the second scrambling identifier.

In a sixteenth aspect, alone or in combination with one or more of the first through fifteenth aspects, the indication of the modified PDCCH configuration for low tier UEs includes an indication of whether to use a linear scrambling scheme for the DCI or a demodulation reference signal (DMRS) associated with the DCI or a non-linear scrambling scheme for the DCI or the DMRS associated with the DCI.

In a seventeenth aspect, alone or in combination with one or more of the first through sixteenth aspects, the UE is a low tier UE or a high tier UE leveraging the modified PDCCH configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
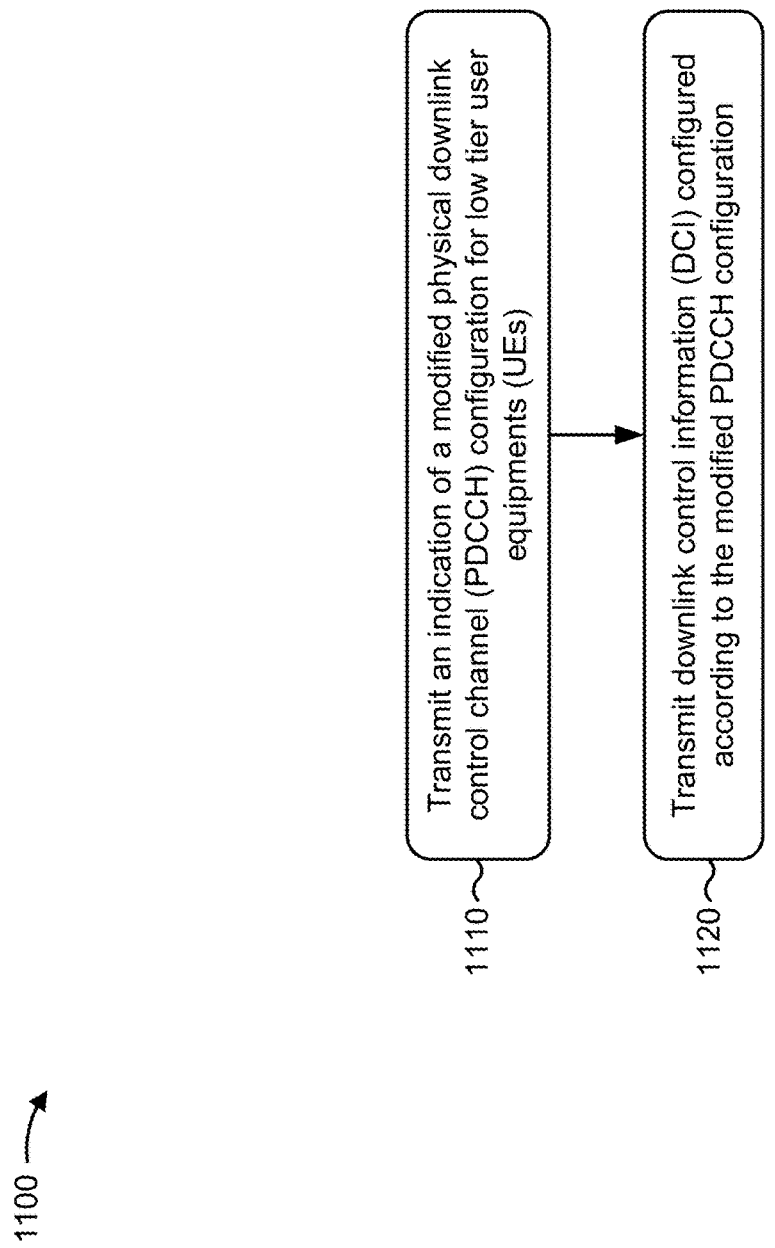
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., base station 110 and/or the like) performs operations associated with modified downlink control information to support low tier user equipment.

As shown in FIG. 11, in some aspects, process 1100 may include transmitting an indication of a modified PDCCH configuration for low tier UEs (block 1110). For example, the base station (e.g., using transmit processor 220, controller/processor 240, memory 242, and/or the like) may transmit an indication of a modified PDCCH configuration for low tier UEs, as described above.

As further shown in FIG. 11, in some aspects, process 1100 may include transmitting DCI configured according to the modified PDCCH configuration (block 1120). For example, the base station (e.g., using transmit processor 220, controller/processor 240, memory 242, and/or the like) may transmit DCI configured according to the modified PDCCH configuration, as described above.

Process 1100 may include additional aspects, such as any single aspect or any combination of aspects described below and/or in connection with one or more other processes described elsewhere herein.

In a first aspect, the indication of the modified PDCCH configuration for low tier UEs is included in system information, a radio resource control message, or a combination thereof.

In a second aspect, alone or in combination with the first aspect, the indication of the modified PDCCH configuration for low tier UEs includes an indication of whether to monitor for legacy DCI or whether to monitor for DCI with a reduced payload size compared to the legacy DCI.

In a third aspect, alone or in combination with one or more of the first and second aspects, the indication of the modified PDCCH configuration for low tier UEs includes an indication of a DCI format for the DCI with the reduced payload size.

In a fourth aspect, alone or in combination with one or more of the first through third aspects, the DCI with the reduced payload size excludes one or more DCI fields included in the legacy DCI, one or more bits of one or more DCI fields included in the legacy DCI, or a combination thereof.

In a fifth aspect, alone or in combination with one or more of the first through fourth aspects, the indication of the modified PDCCH configuration for low tier UEs includes an indication of whether to use at least one of a first de-interleaving pattern or a first frozen bit repetition pattern associated with legacy DCI or at least one of a second de-interleaving pattern or a second frozen bit repetition pattern associated with DCI in which one or more low priority bits of the DCI are mapped to one or more less reliable positions as compared to one or more high priority bits of the DCI.

In a sixth aspect, alone or in combination with one or more of the first through fifth aspects, the second de-interleaving pattern or the second frozen bit repetition pattern is specific to at least one of a DCI format, a DCI payload size, or a radio network temporary identifier associated with the DCI.

In a seventh aspect, alone or in combination with one or more of the first through sixth aspects, the one or more low priority bits include at least one of a reserved bit, a padding bit, an unused bit, a bit mapped to a radio network temporary identifier, a bit mapped to a search space set configuration, or a combination thereof.

In an eighth aspect, alone or in combination with one or more of the first through seventh aspects, the second de-interleaving pattern or the second frozen bit repetition pattern is indicated in a radio resource control message.

In a ninth aspect, alone or in combination with one or more of the first through eighth aspects, one or more values corresponding to the one or more low priority bits are indicated in system information or in a radio resource control message.

In a tenth aspect, alone or in combination with one or more of the first through ninth aspects, one or more values corresponding to the one or more low priority bits are indicated based at least in part on a radio network temporary identifier, a search space set configuration, or a combination thereof.

In an eleventh aspect, alone or in combination with one or more of the first through tenth aspects, the indication of the modified PDCCH configuration for low tier UEs includes an indication of whether to use a radio network temporary identifier (RNTI) having a first bit length to decode the DCI or an RNTI having a second bit length to decode the DCI, the first bit length is shorter than the second bit length.

In a twelfth aspect, alone or in combination with one or more of the first through eleventh aspects, the first bit length is 16 bits and the second bit length is greater than 16 bits.

In a thirteenth aspect, alone or in combination with one or more of the first through twelfth aspects, the indication of the modified PDCCH configuration for low tier UEs includes an indication of the second bit length.

In a fourteenth aspect, alone or in combination with one or more of the first through thirteenth aspects, the indication of the modified PDCCH configuration for low tier UEs includes an indication of whether to test multiple scrambling identifiers when processing the DCI or a demodulation reference signal associated with the DCI.

In a fifteenth aspect, alone or in combination with one or more of the first through fourteenth aspects, a first scrambling identifier indicates a first value for a bit excluded from the DCI if a cyclic redundancy check of the DCI succeeds using the first scrambling identifier, and a second scrambling identifier indicates a second value for the bit if the cyclic redundancy check of the DCI succeeds using the second scrambling identifier.

In a sixteenth aspect, alone or in combination with one or more of the first through fifteenth aspects, the indication of the modified PDCCH configuration for low tier UEs includes an indication of whether to use a linear scrambling scheme for the DCI or a demodulation reference signal (DMRS) associated with the DCI or a non-linear scrambling scheme for the DCI or the DMRS associated with the DCI.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of aspects of the present disclosure:

Aspect 1: A method of wireless communication performed by a user equipment (UE), comprising: receiving an indication of a modified physical downlink control channel (PDCCH) configuration for low tier UEs; receiving downlink control information (DCI) configured according to the modified PDCCH configuration; and processing the DCI according to the modified PDCCH configuration.

Aspect 2: The method of aspect 1, wherein the indication of the modified PDCCH configuration for low tier UEs is included in system information, a radio resource control message, or a combination thereof.

Aspect 3: The method of any of the preceding aspects, wherein the indication of the modified PDCCH configuration for low tier UEs includes an indication of whether to monitor for legacy DCI or whether to monitor for DCI with a reduced payload size compared to the legacy DCI.

Aspect 4: The method of aspect 3, wherein the indication of the modified PDCCH configuration for low tier UEs includes an indication of a DCI format for the DCI with the reduced payload size.

Aspect 5: The method of any of aspects 3 or 4, wherein the DCI with the reduced payload size excludes one or more DCI fields included in the legacy DCI, one or more bits of one or more DCI fields included in the legacy DCI, or a combination thereof.

Aspect 6: The method of any of the preceding aspects, wherein the indication of the modified PDCCH configuration for low tier UEs includes an indication of whether to use at least one of a first de-interleaving pattern or a first frozen bit repetition pattern associated with legacy DCI or at least one of a second de-interleaving pattern or a second frozen bit repetition pattern associated with DCI in which one or more low priority bits of the DCI are mapped to one or more less reliable positions as compared to one or more high priority bits of the DCI.

Aspect 7: The method of aspect 6, wherein the second de-interleaving pattern or the second frozen bit repetition pattern is specific to at least one of a DCI format, a DCI payload size, or a radio network temporary identifier associated with the DCI.

Aspect 8: The method of any of aspects 6 or 7, wherein the one or more low priority bits include at least one of a reserved bit, a padding bit, an unused bit, a bit mapped to a radio network temporary identifier, a bit mapped to a search space set configuration, or a combination thereof.

Aspect 9: The method of any of aspects 6-8, wherein the second de-interleaving pattern or the second frozen bit repetition pattern is indicated in a radio resource control message.

Aspect 10: The method of any of aspects 6-9, wherein one or more values corresponding to the one or more low priority bits are indicated in system information or in a radio resource control message.

Aspect 11: The method of any of aspects 6-10, wherein one or more values corresponding to the one or more low priority bits are determined based at least in part on a radio network temporary identifier, a search space set configuration, or a combination thereof.

Aspect 12: The method of any of the preceding aspects, wherein the indication of the modified PDCCH configuration for low tier UEs includes an indication of whether to use a radio network temporary identifier (RNTI) having a first bit length to decode the DCI or an RNTI having a second bit length to decode the DCI, wherein the first bit length is shorter than the second bit length.

Aspect 13: The method of aspect 12, wherein the first bit length is 16 bits and the second bit length is greater than 16 bits.

Aspect 14: The method of any of aspects 12 or 13, wherein the indication of the modified PDCCH configuration for low tier UEs includes an indication of the second bit length.

Aspect 15: The method of any of the preceding aspects, wherein the indication of the modified PDCCH configuration for low tier UEs includes an indication of whether to test multiple scrambling identifiers when processing the DCI or a demodulation reference signal associated with the DCI.

Aspect 16: The method of aspect 15, wherein a first scrambling identifier indicates a first value for a bit excluded from the DCI if a cyclic redundancy check of the DCI succeeds using the first scrambling identifier, and wherein a second scrambling identifier indicates a second value for the bit if the cyclic redundancy check of the DCI succeeds using the second scrambling identifier.

Aspect 17: The method of any of the preceding aspects, wherein the indication of the modified PDCCH configuration for low tier UEs includes an indication of whether to use a linear scrambling scheme for the DCI or a demodulation reference signal (DMRS) associated with the DCI or a non-linear scrambling scheme for the DCI or the DMRS associated with the DCI.

Aspect 18: The method of any of the preceding aspects, wherein the UE is a low tier UE or a high tier UE leveraging the modified PDCCH configuration.

Aspect 19: A method of wireless communication performed by a base station, comprising: transmitting an indication of a modified physical downlink control channel (PDCCH) configuration for low tier user equipments (UEs); and transmitting downlink control information (DCI) configured according to the modified PDCCH configuration.

Aspect 20: The method of aspect 19, wherein the indication of the modified PDCCH configuration for low tier UEs is included in system information, a radio resource control message, or a combination thereof.

Aspect 21: The method of any of aspects 19 or 20, wherein the indication of the modified PDCCH configuration for low tier UEs includes an indication of whether to monitor for legacy DCI or whether to monitor for DCI with a reduced payload size compared to the legacy DCI.

Aspect 22: The method of aspect 21, wherein the indication of the modified PDCCH configuration for low tier UEs includes an indication of a DCI format for the DCI with the reduced payload size.

Aspect 23: The method of any of aspects 21 or 22, wherein the DCI with the reduced payload size excludes one or more DCI fields included in the legacy DCI, one or more bits of one or more DCI fields included in the legacy DCI, or a combination thereof.

Aspect 24: The method of any of aspects 19-23, wherein the indication of the modified PDCCH configuration for low tier UEs includes an indication of whether to use at least one of a first de-interleaving pattern or a first frozen bit repetition pattern associated with legacy DCI or at least one of a second de-interleaving pattern or a second frozen bit repetition pattern associated with DCI in which one or more low priority bits of the DCI are mapped to one or more less reliable positions as compared to one or more high priority bits of the DCI.

Aspect 25: The method of aspect 24, wherein the second de-interleaving pattern or the second frozen bit repetition pattern is specific to at least one of a DCI format, a DCI payload size, or a radio network temporary identifier associated with the DCI.

Aspect 26: The method of any of aspects 24 or 25, wherein the one or more low priority bits include at least one of a reserved bit, a padding bit, an unused bit, a bit mapped to a radio network temporary identifier, a bit mapped to a search space set configuration, or a combination thereof.

Aspect 27: The method of any of aspects 24-26, wherein the second de-interleaving pattern or the second frozen bit repetition pattern is indicated in a radio resource control message.

Aspect 28: The method of any of aspects 24-27, wherein one or more values corresponding to the one or more low priority bits are indicated in system information or in a radio resource control message.

Aspect 29: The method of any of aspects 24-28, wherein one or more values corresponding to the one or more low priority bits are indicated based at least in part on a radio network temporary identifier, a search space set configuration, or a combination thereof.

Aspect 30: The method of any of aspects 19-29, wherein the indication of the modified PDCCH configuration for low tier UEs includes an indication of whether to use a radio network temporary identifier (RNTI) having a first bit length to decode the DCI or an RNTI having a second bit length to decode the DCI, wherein the first bit length is shorter than the second bit length.

Aspect 31: The method of aspect 30, wherein the first bit length is 16 bits and the second bit length is greater than 16 bits.

Aspect 32: The method of any of aspects 30 or 31, wherein the indication of the modified PDCCH configuration for low tier UEs includes an indication of the second bit length.

Aspect 33: The method of any of aspects 19-32, wherein the indication of the modified PDCCH configuration for low tier UEs includes an indication of whether to test multiple scrambling identifiers when processing the DCI or a demodulation reference signal associated with the DCI.

Aspect 34: The method of aspect 33, wherein a first scrambling identifier indicates a first value for a bit excluded from the DCI if a cyclic redundancy check of the DCI succeeds using the first scrambling identifier, and wherein a second scrambling identifier indicates a second value for the bit if the cyclic redundancy check of the DCI succeeds using the second scrambling identifier.

Aspect 35: The method of any of aspects 19-34, wherein the indication of the modified PDCCH configuration for low tier UEs includes an indication of whether to use a linear scrambling scheme for the DCI or a demodulation reference signal (DMRS) associated with the DCI or a non-linear scrambling scheme for the DCI or the DMRS associated with the DCI.

Aspect 36: An apparatus for wireless communication at a device, comprising a processor; memory coupled with the processor; and instructions stored in the memory and executable by the processor to cause the apparatus to perform the method of one or more aspects of aspects 1-18.

Aspect 37: A device for wireless communication, comprising a memory and one or more processors coupled to the memory, the memory and the one or more processors configured to perform the method of one or more aspects of aspects 1-18.

Aspect 38: An apparatus for wireless communication, comprising at least one means for performing the method of one or more aspects of aspects 1-18.

Aspect 39: A non-transitory computer-readable medium storing code for wireless communication, the code comprising instructions executable by a processor to perform the method of one or more aspects of aspects 1-18.

Aspect 40: A non-transitory computer-readable medium storing a set of instructions for wireless communication, the set of instructions comprising one or more instructions that, when executed by one or more processors of a device, cause the device to perform the method of one or more aspects of aspects 1-18.

Aspect 41: An apparatus for wireless communication at a device, comprising a processor; memory coupled with the processor; and instructions stored in the memory and executable by the processor to cause the apparatus to perform the method of one or more aspects of aspects 19-35.

Aspect 42: A device for wireless communication, comprising a memory and one or more processors coupled to the memory, the memory and the one or more processors configured to perform the method of one or more aspects of aspects 19-35.

Aspect 43: An apparatus for wireless communication, comprising at least one means for performing the method of one or more aspects of aspects 19-35.

Aspect 44: A non-transitory computer-readable medium storing code for wireless communication, the code comprising instructions executable by a processor to perform the method of one or more aspects of aspects 19-35.

Aspect 45: A non-transitory computer-readable medium storing a set of instructions for wireless communication, the set of instructions comprising one or more instructions that, when executed by one or more processors of a device, cause the device to perform the method of one or more aspects of aspects 19-35.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication of a modified physical downlink control channel (PDCCH) configuration for enhanced coverage;
   receiving downlink control information (DCI) configured according to the modified PDCCH configuration; and
   processing the DCI according to the modified PDCCH configuration,
      wherein the indication of the modified PDCCH configuration for enhanced coverage includes at least one of:
         an indication of whether to monitor for a DCI with a reduced payload size compared to legacy DCI, the DCI with the reduced payload size excludes one or more DCI fields included in the legacy DCI, one or more bits of one or more DCI fields included in the legacy DCI, or a combination thereof,
         an indication of whether to use at least one of a first de-interleaving pattern or a first frozen bit repetition pattern associated with the legacy DCI or at least one of a second de-interleaving pattern or a second frozen bit repetition pattern associated with the DCI in which one or more low priority bits of the DCI are mapped to one or more less reliable positions as compared to one or more high priority bits of the DCI, one or more values corresponding to the one or more low priority bits are indicated in system information or in a radio resource control message, or an indication of whether to use a first radio network temporary identifier (RNTI) having a first bit length to decode the DCI or a second RNTI having a second bit length, longer than the first bit length, to decode the DCI.

2. The method of claim 1, wherein the indication of the modified PDCCH configuration for enhanced coverage is included in system information, a radio resource control message, or a combination thereof.

3. The method of claim 1, wherein the indication of the modified PDCCH configuration for enhanced coverage further includes an indication of a DCI format for the DCI with the reduced payload size.

4. The method of claim 1, wherein the at least one of the second de-interleaving pattern or the second frozen bit repetition pattern is specific to at least one of a DCI format, a DCI payload size, or a radio network temporary identifier associated with the DCI.

5. The method of claim 1, wherein the one or more low priority bits include at least one of a reserved bit, a padding bit, an unused bit, a bit mapped to a radio network temporary identifier, a bit mapped to a search space set configuration, or a combination thereof.

6. The method of claim 1, wherein the at least one of the second de-interleaving pattern or the second frozen bit repetition pattern is indicated in a radio resource control message.

7. The method of claim 1, wherein the one or more values corresponding to the one or more low priority bits are determined based at least in part on a radio network temporary identifier, a search space set configuration, or a combination thereof.

8. The method of claim 1, wherein the first bit length is 16 bits and the second bit length is greater than 16 bits.

9. The method of claim 1, wherein the indication of the modified PDCCH configuration for enhanced coverage includes an indication of the second bit length.

10. The method of claim 1, wherein the indication of the modified PDCCH configuration for enhanced coverage further includes an indication of whether to test multiple scrambling identifiers when processing the DCI or a demodulation reference signal associated with the DCI.

11. The method of claim 10, wherein a first scrambling identifier indicates a first value for a bit excluded from the DCI if a cyclic redundancy check of the DCI succeeds using the first scrambling identifier, and wherein a second scrambling identifier indicates a second value for the bit if the cyclic redundancy check of the DCI succeeds using the second scrambling identifier.

12. The method of claim 1, wherein the indication of the modified PDCCH configuration for enhanced coverage further includes an indication of whether to use a linear scrambling scheme for the DCI or a demodulation reference signal (DMRS) associated with the DCI or a non-linear scrambling scheme for the DCI or the DMRS associated with the DCI.

13. The method of claim 1, wherein the UE is a low tier UE or a high tier UE leveraging the modified PDCCH configuration.

14. A method of wireless communication performed by a network node, comprising:
 transmitting an indication of a modified physical downlink control channel (PDCCH) configuration for enhanced coverage; and
 transmitting downlink control information (DCI) configured according to the modified PDCCH configuration, wherein the indication of the modified PDCCH configuration for enhanced coverage includes at least one of:
  an indication of whether to monitor for a DCI with a reduced payload size compared to legacy DCI, the DCI with the reduced payload size excludes one or more DCI fields included in the legacy DCI, one or more bits of one or more DCI fields included in the legacy DCI, or a combination thereof,
  an indication of whether to use at least one of a first de-interleaving pattern or a first frozen bit repetition pattern associated with the legacy DCI or at least one of a second de-interleaving pattern or a second frozen bit repetition pattern associated with the DCI in which one or more low priority bits of the DCI are mapped to one or more less reliable positions as compared to one or more high priority bits of the DCI, one or more values corresponding to the one or more low priority bits are indicated in system information or in a radio resource control message, or
  an indication of whether to use a first radio network temporary identifier (RNTI) having a first bit length to decode the DCI or a second RNTI having a second bit length, longer than the first bit length, to decode the DCI.

15. The method of claim 14, wherein the indication of the modified PDCCH configuration for enhanced coverage further includes an indication of whether to test multiple scrambling identifiers when processing the DCI or a demodulation reference signal associated with the DCI.

16. The method of claim 14, wherein the indication of the modified PDCCH configuration for enhanced coverage further includes an indication of whether to use a linear scrambling scheme for the DCI or a demodulation reference signal (DMRS) associated with the DCI or a non-linear scrambling scheme for the DCI or the DMRS associated with the DCI.

17. The method of claim 14, wherein the indication of the modified PDCCH configuration for enhanced coverage is included in system information, a radio resource control message, or a combination thereof.

18. The method of claim 14, wherein the indication of the modified PDCCH configuration for enhanced coverage further includes an indication of a DCI format for the DCI with the reduced payload size.

19. The method of claim 14, wherein:
 the at least one of the second de-interleaving pattern or the second frozen bit repetition pattern is specific to at least one of a DCI format, a DCI payload size, or a radio network temporary identifier associated with the DCI,
 the one or more low priority bits include at least one of a reserved bit, a padding bit, an unused bit, a bit mapped to a radio network temporary identifier, a bit mapped to a search space set configuration, or a combination thereof, or
 the at least one of the second de-interleaving pattern or the second frozen bit repetition pattern is indicated in a radio resource control message.

20. A user equipment (UE) for wireless communication, comprising:
 a memory; and
 one or more processors coupled to the memory, the memory comprising instructions executable by the one or more processors to cause the UE to:

receive an indication of a modified physical downlink control channel (PDCCH) configuration for enhanced coverage;

receive downlink control information (DCI) configured according to the modified PDCCH configuration; and process the DCI according to the modified PDCCH configuration, wherein the indication of the modified PDCCH configuration for enhanced coverage includes at least one of:

an indication of whether to monitor for a DCI with a reduced payload size compared to legacy DCI, the DCI with the reduced payload size excludes one or more DCI fields included in the legacy DCI, one or more bits of one or more DCI fields included in the legacy DCI, or a combination thereof, an indication of whether to use at least one of a first de-interleaving pattern or a first frozen bit repetition pattern associated with the legacy DCI or at least one of a second de-interleaving pattern or a second frozen bit repetition pattern associated with the DCI in which one or more low priority bits of the DCI are mapped to one or more less reliable positions as compared to one or more high priority bits of the DCI, one or more values corresponding to the one or more low priority bits are indicated in system information or in a radio resource control message, or an indication of whether to use a first radio network temporary identifier (RNTI) having a first bit length to decode the DCI or a second RNTI having a second bit length, longer than the first bit length, to decode the DCI.

21. The UE of claim 20, wherein the indication of the modified PDCCH configuration for enhanced coverage further includes an indication of whether to test multiple scrambling identifiers when processing the DCI or a demodulation reference signal associated with the DCI.

22. The UE of claim 20, wherein the indication of the modified PDCCH configuration for enhanced coverage is included in system information, a radio resource control message, or a combination thereof.

23. The UE of claim 20, wherein the indication of the modified PDCCH configuration for enhanced coverage further includes an indication of a DCI format for the DCI with the reduced payload size.

24. The UE of claim 20, wherein:
the at least one of the second de-interleaving pattern or the second frozen bit repetition pattern is specific to at least one of a DCI format, a DCI payload size, or a radio network temporary identifier associated with the DCI,
the one or more low priority bits include at least one of a reserved bit, a padding bit, an unused bit, a bit mapped to a radio network temporary identifier, a bit mapped to a search space set configuration, or a combination thereof, or
the at least one of the second de-interleaving pattern or the second frozen bit repetition pattern is indicated in a radio resource control message.

25. The UE of claim 20, wherein:
the first bit length is 16 bits and the second bit length is greater than 16 bits, or
the indication of the modified PDCCH configuration for low tier UEs enhanced coverage includes an indication of the second bit length.

26. The UE of claim 20, wherein the UE is a low tier UE or a high tier UE leveraging the modified PDCCH configuration.

27. A network node for wireless communication, comprising:
a memory; and
one or more processors coupled to the memory, the memory comprising instructions executable by the one or more processors to cause the network node to:
transmit an indication of a modified physical downlink control channel (PDCCH) configuration for enhanced coverage; and
transmit downlink control information (DCI) configured according to the modified PDCCH configuration,
wherein the indication of the modified PDCCH configuration for enhanced coverage includes at least one of:
an indication of whether to monitor for a DCI with a reduced payload size compared to legacy DCI, the DCI with the reduced payload size excludes one or more DCI fields included in the legacy DCI, one or more bits of one or more DCI fields included in the legacy DCI, or a combination thereof,
an indication of whether to use at least one of a first de-interleaving pattern or a first frozen bit repetition pattern associated with the legacy DCI or at least one of a second de-interleaving pattern or a second frozen bit repetition pattern associated with the DCI in which one or more low priority bits of the DCI are mapped to one or more less reliable positions as compared to one or more high priority bits of the DCI, one or more values corresponding to the one or more low priority bits are indicated in system information or in a radio resource control message, or
an indication of whether to use a first radio network temporary identifier (RNTI) having a first bit length to decode the DCI or a second RNTI having a second bit length, longer than the first bit length, to decode the DCI.

28. The network node of claim 27, wherein the indication of the modified PDCCH configuration for enhanced coverage is included in system information, a radio resource control message, or a combination thereof.

29. The network node of claim 27, wherein the indication of the modified PDCCH configuration for enhanced coverage further includes an indication of a DCI format for the DCI with the reduced payload size.

30. The network node of claim 27, wherein the indication of the modified PDCCH configuration for enhanced coverage further includes an indication of whether to test multiple scrambling identifiers when processing the DCI or a demodulation reference signal associated with the DCI.

* * * * *